United States Patent

[11] 3,620,243

| [72] | Inventors | Edward J. Zatopek;<br>James L. Bitting, both of Baton Rouge, La. |
|---|---|---|
| [21] | Appl. No. | 854,875 |
| [22] | Filed | Sept. 3, 1969 |
| [45] | Patented | Nov. 16, 1971 |
| [73] | Assignee | Ethyl Corporation<br>New York, N.Y. |

[54] SEALED BALL VALVE
6 Claims, 5 Drawing Figs.

[52] U.S. Cl. ..................................... 137/246.22,
251/315, 277/75
[51] Int. Cl. ........................................ F16k 5/06
[50] Field of Search............................. 251/172,
328; 277/74, 75, 70, 76–78; 137/246–246.23

[56] References Cited
UNITED STATES PATENTS

| 2,006,715 | 7/1935 | McCausland.............. | 137/246.16 |
| 2,684,262 | 7/1954 | Neesen..................... | 277/75 X |
| 3,100,499 | 8/1963 | Bass......................... | 251/172 X |
| 3,306,315 | 2/1967 | Cook........................ | 137/246.22 |
| 2,747,600 | 5/1956 | Laurent..................... | 251/172 X |
| 2,754,136 | 7/1956 | Phillips..................... | 277/70 |

*Primary Examiner*—M. Cary Nelson
*Assistant Examiner*—Richard Gerard
*Attorney*—Donald L. Johnson ABSTRACT: A ball valve comprising a seal ring having a groove in the face thereof and a liquid sealant in said groove.

SEALED BALL VALVE

BACKGROUND OF THE INVENTION

The present invention relates to ball valves and more particularly to valves of the type employing seat rings with flexible lips, for example, as shown in U.S. Pat. No. 2,945,666.

The value described in the foregoing patent is a two-way valve employing the ball with a straight groove passage, and a pair of seat rings, one disposed on each side of the ball, carrying inwardly extending flexible lips. The ball can be turned between an opened position in which its passage is aligned with the pipe line, and a closed position in which its passage is traverse to the pipe line. The ball is engaged by the flexible lips of the seat rings and has a floating connection with its stem. In the closed position, pressure on the upstream side of the ball causes it to move into tighter sealing engagement with the downstream ring Ball valves for handling corrosive or radioactive materials and fluids at high temperature, present an especially difficult sealing problem. It is essential to form a perfectly tight seal between the ball and the seat, usually on both the upstream and the downstream side, and yet the valve must open and close easily. Should valves be installed in dangerous or inaccessible locations, shutting down the equipment for repairs on a valve or replacement of the valve seat may be extremely costly. The valve seats must, therefore, be constructed to withstand long wear without leaking.

The primary object of the present invention is to produce a valve seat construction which provides maximum security against leakage, which reduces wear on the seats to a minimum, and which insures smooth opening and closing of the valves.

Another object of the present invention is to provide a seat construction which is adapted not only for seats made of the flexible rubberlike materials ordinarily used, but also for seats made of hard plastics or even metals, where extreme temperature or load conditions preclude the use of rubberlike materials.

The principal of the present invention is to improve the sealing of a ball valve for gas or vapor service by employing a liquid sealant in conjunction with a resilient seat. The principal advantage of this arrangement over the present method is that the sealing is against a liquid rather than a gas or vapor.

SUMMARY OF THE INVENTION

The valve disclosed herein includes a ball, a valve casing, a stem for controlling the ball, and a bonnet, all of which may be of generally conventional construction. Preferably a pair of seating rings, one on the upstream side and one on the downstream side of the ball are employed as the sealing elements. These rings have lips which are free to deflect to a greater or lesser extent, depending on the seat material and the load conditions, and which are shaped and proportioned in such a manner as to engage the ball at a suitable angle with respect to the direction of flow. A groove or grooves are provided in the seat faces of the sealing rings which contact the ball for the liquid sealant as described hereinafter in greater detail. The sealant is forced into the groove after the valve has been closed through a series of holes and grooves machined into the seats and the valve body.

The construction designed to carry out the invention will be hereinafter described. Together with other features thereof.

The invention will be more readily understood from a reading of the following specification and by reference to the accompanying drawings forming a part thereof, wherein an example of the invention is shown wherein:

DESCRIPTION OF THE PREFERRED EMBODIMENT

Figure 1:
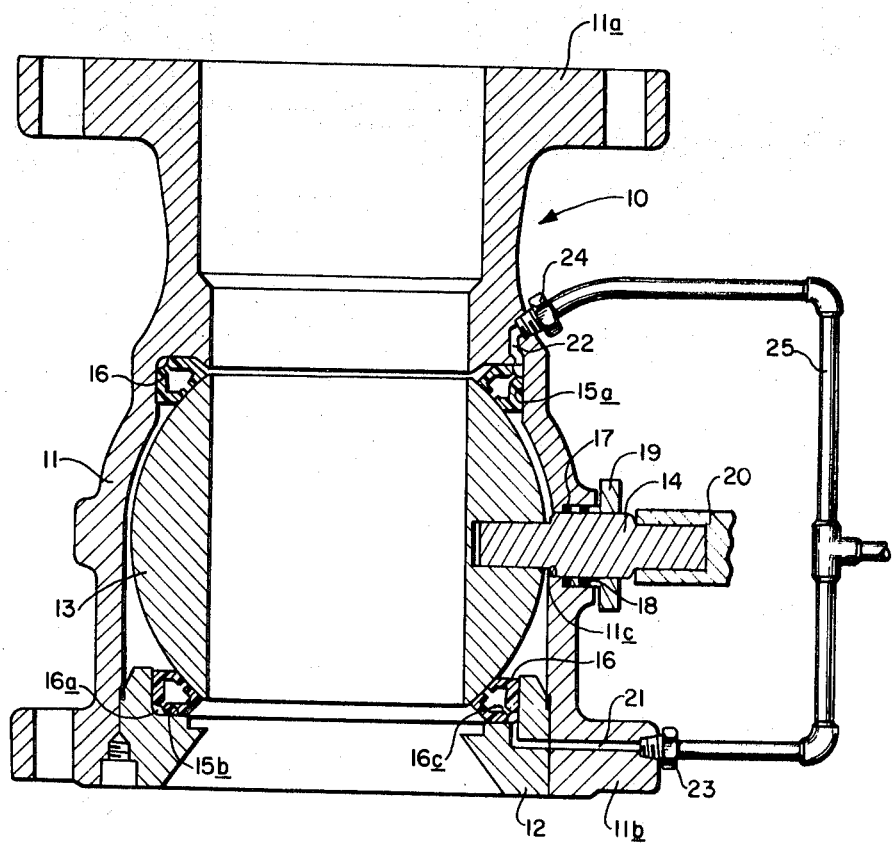
FIG. 1 is a cross section, taken along the axis of rotation of the ball, of the valve construction according to the invention.

Referring to the drawings in detail, and particularly to FIG. 1, a reference character 10 generally designates a ball valve which includes a valve body 11 and upstream and downstream connects $a$ and $11b$, respectively. The valve body 11 includes a body insert 12 ball 13 which is mounted on a stem 14. The body 11 has a value seat 15 $A$ in the upper end thereof and the body insert 12 has a valve seat $15b$ in the lower end of the valve body 11.

In the valve seal seats or cavities $15a$ and $15IIb$ are inserted resilient seal rings 16 which will be explained in more detail hereinafter. The seal rings may be constructed of various materials ranging from fairly soft material or synthetic rubbers to metal. Teflon plastic has been found to be particularly suitable.

The ball 13 is mounted between the seals or sealing rings 16. FIG. 1 of the drawings illustrates the ball 13 in an open position, wherein fluids may be moved through the valve 10. The stem 14 is positioned in an opening $11C$ in the valve body 11 and fitted with steam seal 17, a compression ring 18 and a bonnet plate 19, all of which prevent leakage of fluid from within the valve body 11. A handle 20, only partially shown, is joined to the stem 14 by any suitable means and may be turned automatically or by hand as desired so as to rotate the ball 13 from an open to a closed position or vice versa.

The valve body 11 has two openings for passageways, 21 and 22, therein whereby grease or other suitable sealing fluid may be introduced into the valve body in the area of the valve seal seats $15b$ and $15a$, respectively. Grease connectors 23 and 24 are positioned in the valve body 11 so as to be in a communication with the passageways 21 and 22, respectively, and with each other through an equalizer line 25 or the like. The line 25 is connected to any suitable grease or sealing fluid source. The grease or sealing fluid may be injected into the openings 21 and 22 either manually or by any suitable automatic device.

The equalizer line 25 enables the sealing fluid to be moved from one seating position and/or ring when fluid pressures are changed. For example, if pressure is increased on the down stream seal, pressure is correspondingly decreased on the upstream seal and the sealing fluid is forced into the upstream seal to maintain a positive seal. The escape of the sealing fluid into the valve opening is substantially inhibited.

Figure 2:
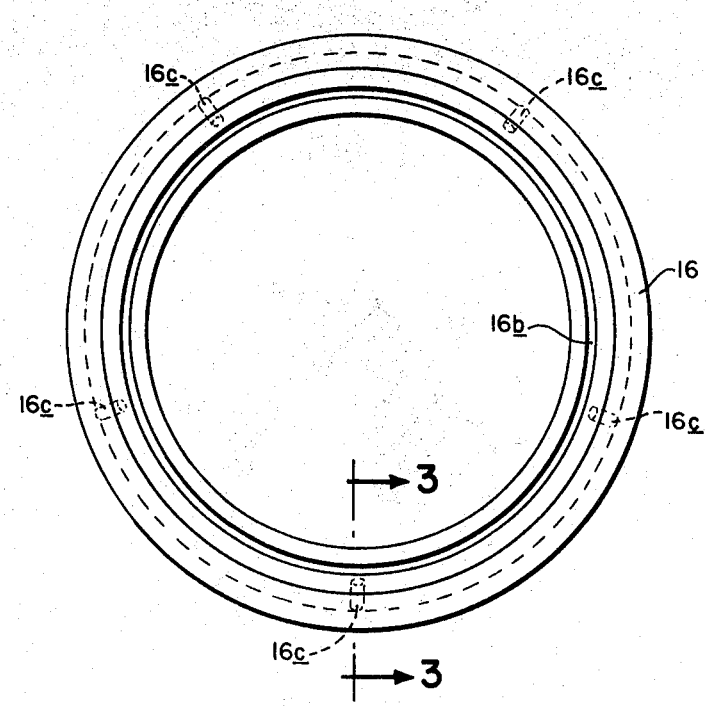
FIG. 2 is a plan view of a seat ring or sealing ring of the instant invention.
Figure 3:
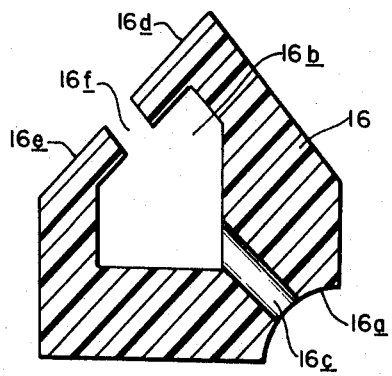
FIG. 3 is an enlarged cross section taken along line 3—3 of FIG. 2, showing one form of construction of a sealing ring.

The seal rings 16 are adapted to receive the sealing fluid and are illustrated in detail in FIGS. 2 and 3. Each of the seal rings 16 has a plurality of openings $16c$ which permit fluid to pass from the opening $16a$ which extends circumferentially around the ring 16 and the opening $16b$ which also extends circumferentially around the ring 16. The openings $16a$ and $16b$ may be of any desired size and/or suitable configuration. The openings should not be so large as to unduly weaken the ring or to decrease to ineffectiveness the surface area of the seat ring in contact with the ball and the surface area of said ring in contact with the valve seal seat or cavity. The ring 16 also has lips or flanges $16d$ and $16e$ which are separated by the opening $16f$ which are in sealing contact with the ball 13 as seen in FIG. 1. Grease or sealing fluid is forced into the opening $16a$, substantially filling said opening or groove and through each of the openings $16c$ into the larger opening $16b$ wherein pressure is exerted against the lips $16d$ and $16e$ thereby forcing these lips in sealing contact with the ball 13 and also filling the opening $16f$ with grease or sealing fluid.

The sealing lips $16d$ and $16e$ must be of sufficient strength and area to seal against design pressure. It is important that the sealing surface of the lips substantially fully engage the ball whenever the ball is in a closed position for proper sealing.

When the ball 13 is in a closed position, the opening in the ball should be at least just beyond the edge of the lip of the seal ring on the internal side. Any suitable stop or indicator may be positioned externally on the valve to limit or indicate the movement of the valve opening to assure that the valve is properly closed.

The ring 16 is illustrated with five openings 16c therein and which are spaced equidistantly apart. A greater or lesser number of openings may be employed as desired; however, the number should not be so great that the seal is unduly weakened, or the numbers should not be so few that it is difficult to fill the grooves 16a and 16b with the sealing fluid.

Figure 4:
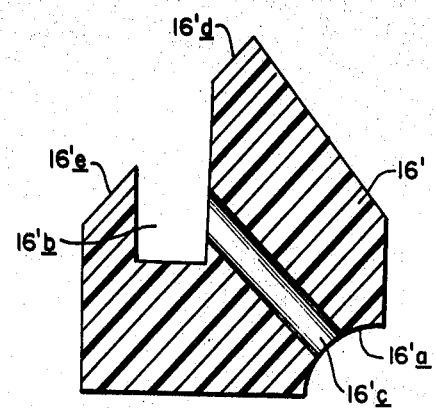
FIG. 4 is a cross-sectional view similar to FIG. 3 illustrating the shape of an alternate type of seal ring.

FIG. 4 illustrates an alternate embodiment of the present invention, and the seal ring 16′ has an opening 16′a which extends circumferentially around the seal ring, a plurality of openings 16′c which permit fluid to pass from the groove 16′a to the groove 16′b which groove 16′b also extends circumferentially around the seal ring 16′. As the grease or sealing fluid is injected or forced through the openings 16′c into the opening 16′b, the lip 16′e is forced into sealing contact with the ball 13, similarly to the ring 16 illustrated in FIGS. 1, 2 and 3, and lip 16′d retains the fluid in said groove 16′b.

Figure 5:
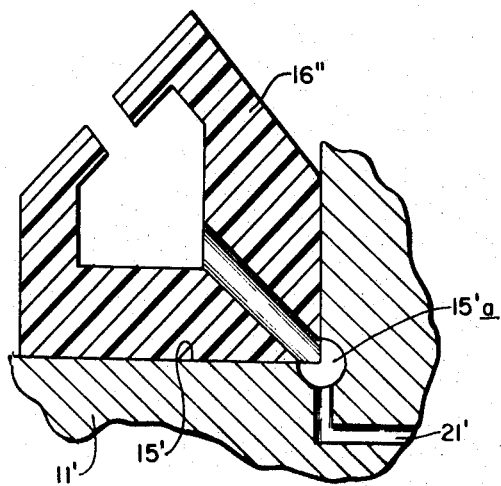
FIG. 5 is a cross-sectional view similar to FIG. 3 illustrating the shape of another embodiment of a sealing ring and an alternative valve body for use with said ring.

FIG. 5 illustrates another alternate embodiment of a seal or seat ring 16″ which is similar to ring 16, but does not have the groove or opening 16a. The ring 16″ is adapted to be seated in a valve seat is ′ which has an opening or groove 15′a for a is in communication with a grease port 21′ in the valve body 11′. Variations may also be made in the size and configuration of the groove 15′a, but it should extend completely around the seat ring, and not be so large or so shaped as to unduly diminish the strength or prevent the proper seating of the ring 16″.

Valves of the construction can be made liquid- and gastight on both the upstream and the downstream side under extremely high pressure. Since hard materials, even metal, can be used for the seals, it is possible to manufacture valves for high-temperature use and for long wear in locations where access to the valves for repair is difficult or possible. The valve construction of the present invention is particularly desirable for use with granular or abrasive fluids. The combination grease seal and resilient seal provides a superior seal to any other known prior art sealing arrangement. When solvents or other corrosive fluids which might have an effect on a sealing fluid are transported or moved through a valve, the construction of the present invention prohibits an exposure of the sealing fluid to such solvent or corrosive fluid.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A ball valve comprising: a valve body; a valve chamber in said body having inlet and outlet openings; a ball mounted in said chamber having a cylindrical internal passage with ports at each end; a pair of sealing rings mounted on opposite sides of said ball; a seat for said rings in said valve body; a passageway in said valve body connecting each of said seats with an external sealing fluid supply source; each of said rings having a circumferential groove therein adjacent the ring seat and in fluid communication with one of said passageways; each of said rings having a second circumferential groove therein in communication with the said ball and having a pair of lips formed by said groove which engage said ball around and spaced from one of said ports; each of said seal rings having at least one passageway fluidly connecting said grooves; and a sealing fluid substantially filling said grooves, said pair of lips being so constructed and arranged that when external pressure is exerted against the sealing fluid, the sealing fluid forces at least one of said lips in sealing contact with said ball.

2. The ball valve of claim 1 wherein said valve body includes a sealing fluid supply means.

3. The ball valve of claim 2, wherein said sealing fluid supply means includes an equalizer means for moving sealing fluid from the area of one seat ring to the area of the other seat ring.

4. A ball valve comprising: a valve body; a valve chamber in said body having inlet and outlet openings; a ball mounted in said chamber having a cylindrical internal passage with ports at each end; a pair of sealing rings mounted on opposite sides of said ball; a seat for said rings in said valve body, said valve seat having a circumferential groove therein for receiving a sealing fluid; a passageway in said valve body connecting each of said grooves with an external sealing fluid supply source; each of said rings having a circumferential groove therein in communication with said ball and having a pair of lips formed by said groove which engage said ball around and spaced from one of said ports; each of said seal rings having at least one passageway fluidly connecting said groove in said ring with said groove in said ring seat; and a sealing fluid substantially filling said grooves, said pair of lips being so constructed and arranged that when external pressure is exerted against the sealing fluid, the sealing fluid forces at least one of said lips in sealing contact with said ball.

5. The ball valve of claim 4, wherein said valve body includes a sealing fluid supply means.

6. The ball valve of claim 4, wherein said sealing fluid supply means includes an equalizer means for moving sealing fluid from the area of one seat ring to the area of the other seat ring.

* * * * *

PO-1050
(5/69)

UNITED STATES PATENT OFFICE
CERTIFICATE OF CORRECTION

Patent No. 3,620,243            Dated November 16, 1971

Inventor(s) Edward J. Zatopek and James L. Bitting

It is certified that error appears in the above-identified patent and that said Letters Patent are hereby corrected as shown below:

Column 1, line 7, reads "value", should read -- valve --.
Column 2, line 10, reads "connects", should read -- connectors --.
Column 2, line 11, reads "12 ball", should read -- 12 and a -- ball. Column 2, line 12, reads "value", should read -- valve --
Column 2, line 15, reads "1511b", should read -- 15b --.
Column 3, line 23, reads "is ' ", should read is -- 15' --.
Column 3, line 23, reads "for a is in", should read for -- the sealing fluid, and which opening 15'a is in --.

Signed and sealed this 23rd day of May 1972.

(SEAL)
Attest:

EDWARD M.FLETCHER,JR.          ROBERT GOTTSCHALK
Attesting Officer                Commissioner of Patents